(12) United States Patent
Hagawa et al.

(10) Patent No.: US 9,113,642 B2
(45) Date of Patent: Aug. 25, 2015

(54) FEED COMPOSITION

(75) Inventors: Yoshihito Hagawa, Edogawa-ku (JP);
Yasunori Kagawa, Gyoda (JP);
Kiyotaka Sakai, Nishiibaraki-gun (JP);
Takenori Orihashi, Ichikawa (JP);
Yukimasa Kishimura, Higashimurayama (JP); Michio Kanbe, Higashimurayama (JP)

(73) Assignee: Meiji Feed Co., Ltd., Tokyo (JP)

( * ) Notice: Subject to any disclaimer, the term of this patent is extended or adjusted under 35 U.S.C. 154(b) by 1777 days.

(21) Appl. No.: 10/552,542

(22) PCT Filed: Apr. 8, 2004

(86) PCT No.: PCT/JP2004/005089
§ 371 (c)(1),
(2), (4) Date: Oct. 11, 2005

(87) PCT Pub. No.: WO2004/089109
PCT Pub. Date: Oct. 21, 2004

(65) Prior Publication Data
US 2006/0204553 A1 Sep. 14, 2006

(30) Foreign Application Priority Data
Apr. 8, 2003 (JP) .............................. P. 2003-104551

(51) Int. Cl.
| | | |
|---|---|---|
| A23C 11/00 | (2006.01) | |
| A23K 1/08 | (2006.01) | |
| A23K 1/00 | (2006.01) | |
| A23K 1/18 | (2006.01) | |

(52) U.S. Cl.
CPC ................. *A23C 11/00* (2013.01); *A23K 1/006* (2013.01); *A23K 1/008* (2013.01); *A23K 1/08* (2013.01); *A23K 1/1893* (2013.01); *A23Y 2220/37* (2013.01)

(58) Field of Classification Search
CPC ........... A23V 2002/00; A23V 2200/10; A23V 2250/206; A23V 2200/30; A23V 2200/32; A23V 2200/3204; A23V 2200/00; A23V 2200/122; A23V 2200/3324; A23Y 2220/37; A23Y 2220/61; A23Y 2220/71; A61K 35/747; A61K 35/74; A61K 35/744; A61K 38/00; A61K 35/741; A23K 1/009; A23K 1/1813; A23K 1/1826; A23K 1/1846; A23K 1/1886; A23K 1/006; A23K 1/008; A23K 1/08; A23K 1/1893; A23L 1/3014; A23C 11/00

See application file for complete search history.

(56) References Cited

U.S. PATENT DOCUMENTS

| | | | | |
|---|---|---|---|---|
| 3,021,262 | A | * | 2/1962 | Perlman .......................... 435/86 |
| 6,541,027 | B1 | * | 4/2003 | Antoine et al. ................ 424/439 |
| 6,596,530 | B1 | * | 7/2003 | Kimura et al. .............. 435/252.9 |
| 6,953,574 | B2 | * | 10/2005 | Sobol et al. ................. 424/93.45 |
| 7,153,502 | B2 | * | 12/2006 | Kimura et al. .............. 424/93.45 |
| 7,211,280 | B1 | * | 5/2007 | Young et al. ....................... 426/2 |
| 2002/0146399 | A1 | | 10/2002 | Raczek |

FOREIGN PATENT DOCUMENTS

| | | | |
|---|---|---|---|
| EP | 1112692 A1 | * | 7/2001 |
| JP | 62-104552 | | 5/1987 |
| JP | 1-98446 | | 4/1989 |
| JP | 3046303 | | 3/2000 |
| JP | 2000-287626 | | 10/2000 |
| JP | 2001143 | * | 1/2001 |
| JP | 20012578 | * | 1/2001 |
| JP | 2001-275658 | | 9/2001 |
| JP | 2002-335953 | | 11/2002 |
| JP | 2003-253262 | | 9/2003 |
| JP | 2004-189672 | | 7/2004 |
| WO | WO-03/071883 A1 | | 9/2003 |

OTHER PUBLICATIONS

Supplemental European Search Report dated Feb. 2, 2007.
International Search Report dated Aug. 3, 2004.
Jelinski et al. Can. Vet. J. 36: 379-382, Jun. 1995.
International Dairy Federation, Cultured and Culture-containing Dairy Products in Health, 1999.
Reuter, Bioscience Microflora 16(2) 43-51, 1997.

* cited by examiner

*Primary Examiner* — Debbie K Ware
(74) *Attorney, Agent, or Firm* — Sughrue Mion, PLLC

(57) ABSTRACT

A feed supplement comprising at least one selected from lactic acid bacterium belonging to *Lactobacillus gasseri*, a crushed product of the lactic acid bacterium, culture of the lactic acid bacterium, residue of the culture of the lactic acid bacterium and a treated product thereof (a concentrate, a pasted product, a dried product, a liquid product, a diluted product, a sterilized product, etc.) and a feed composition comprising the feed supplement.

8 Claims, 3 Drawing Sheets

FEED COMPOSITION

This application is a 371 of PCT/JP04/05089, filed Apr. 8, 2004.

TECHNICAL FIELD

The present invention relates to a feed composition, more specifically, a feed composition comprising a feed supplement derived from *Lactobacillus gasseri* (which may hereinafter be called *L. gasseri*). The feed supplement of the invention has an intestinal flora-improving activity, an anti-diarrhea activity, an antioxidant activity, and a weight-increasing activity, also has a growth-promoting effect which is same or more excellent than that with using an antibiotic, and can be used, for example, for the manufacture of a substitute milk for calves.

BACKGROUND ART

Smooth growth is not easy even for adult livestock, and more difficult for young livestock which is inferior in physical strength and more delicate. For example, in the case of newborn calves, growth-inhibitory factor include insufficient intake of colostrum, inadequate (unsanitary) environment, change in feed, change from mother's milk to artificial feed (substitute milk, starter, or the like), and stress due to transportation or change in breeding environment.

In the intestine of a healthy animal, certain intestinal normal inhabitants existing on the intestinal mucosal epithelia prevent the infections with various pathogenic bacteria. On the other hand, the intestinal flora loses its balance by a change in diet, stress or administration of an antibiotic. It has been reported that a decrease of either one of *Lactobacillus* or *Bifidobacterium* was observed in calves suffering from diarrhea, and it has been pointed out that these beneficial bacteria are important.

Major diseases of calves are digestive diseases having diarrhea as a main symptom and respiratory diseases having pneumonia as a main symptom. Diarrhea appears within two weeks after the introduction, followed by the respiratory diseases. Calves lose their passive antibodies two or three weeks after birth and the calves themselves start production of antibodies on and after four weeks after birth. Infectious diseases of calves due to IgG insufficiency include, for example, diarrhea caused by *Escherichia coli*, rotavirus, coronavirus, *Cryptosporidium* or *Salmonella*. It has been reported that group of calves having a high incidence of pneumonia suffered from diarrhea or malnutrition after birth and are recognized to have depressed thymus-derived cell function during one month after birth which is an important period for the maturation of lymphocytes.

Since calves have a remarkably high morbidity and mortality thereof often exceeds 5%, and it has been a disincentive for management.

Accordingly, antibiotics have come to be used in this industry. Administration of antibiotics (colistin sulfate and bacitracin zinc) to calves is permitted, for example, in Japan. However, it is socially desired not to use antibiotics in view of prevention of appearance of resistant bacteria thereto. However, in practice, antibiotics are frequently used for promoting growth of calves. In Japan, there is a tendency to legally prohibit the use of antibiotics. Therefore, in this industry, there is a demand for the development of a feed additive composition which can be used safely as a substitute for antibiotics.

As the growth promoters for calves other than antibiotics, the followings are commercially available at present. However, none of the followings are found to be superior in effect to antibiotics permitted at present.

(1) Probiotics (*Enterococcus faecalis, Enterococcus faecium, Clostrdium butyricum, Bacillus subtilis, Bacillus cereus, Bifidobacterium thermophilum, Bifidobacterium pseudolongum, Lactobacillus acidophilus*)

(2) Oligosaccharides (3) β-carotene (4) Vitamin C (5) Herb (oregano) extract (6) Yeast cell-wall constituent (glucomannan), yeast cell-membrane constituent (β-glucan)

With regards to probiotics, administration of a residue of culture of *Bifidobacterium adolescentis* ATCC 15703 to calves in combination with an antibiotic has been proposed and the effect on weight gain has been investigated. However, this proposal is based on the use in combination with the antibiotic, and single use of the above *bifidobacterium* is not included (refer to, for example, JP-A-62-104552).

With regards to *Lactobacillus acidophilus*, there is a report on the administration of *L. acidophilus* to calves, but satisfactory results have not been obtained yet. In addition, although a probiotic of *L. acidophilus* is commercially available, it is not composed of *L. acidophilus* alone but a mixture with another bacterium. In 1980, re-classification of *L. acidophilus* into 6 sub-groups (*L. acidophilus, L. crispatus, L. amylovorus, L. gallinarum, L. gasseri,* and *L. johnsonii*) was proposed according to the homology of a chromosomal DNA possessed by the bacterium and sugar composition analysis of cell wall constituents. Since it is not clear to which sub-group of the 6 sub-groups the *L. acidiphilus* which has not been classified by the above-described identification method belongs, it is impossible to identify the kind of bacterium.

Lactic acid bacteria belonging to *Lactobacillus gasseri* and substances containing the same have been found to have an inhibiting activity against *Helicobacter pylori* (which may hereinafter be called *H. pylori*) which is a cause of gastric ulcer and is pointed out to have a relation to gastric cancer (refer to, for example, Japanese Patent No. 3046303). However, it has not been known that the bacterium body of *L. gasseri*, culture thereof, or residue of culture which is obtained by separating and removing solid matters from the culture has an intestinal flora-improving activity, an anti-diarrhea activity, an antioxidant activity and a weight-increasing activity for young livestock such as calves.

DISCLOSURE OF THE INVENTION

An object of the invention is to newly develop, under such conditions of current technology, a feed additive having effects which is same or more excellent than those of an antibiotic, without using the antibiotic.

In order to achieve the above-described object, the present inventors have carried out extensive investigations on the substitute for antibiotics from various viewpoints and, as a result, carried out screening of various bacteria with paying attention to probiotics.

In addition, the present inventors paid attention to *Lactobacillus gasseri* and have carried out earnest investigations. As a result, it is found that administration of a culture of *L. gasseri* or centrifugal supernatant of the culture (residue of the culture) to young livestock brings about the excellent effects in comparison with those brought about by the administration of antibiotics, for example, in the improvement of intestinal flora, prevention of diarrhea, oxidation prevention and weight increase, and accordingly, the present invention has been achieved.

More specifically, the present invention relates to the following (1) to (26).

(1) A feed supplement comprising at least one selected from a lactic acid bacterium belonging to *Lactobacillus gasseri*, a crushed product of the lactic acid bacterium, a culture of the lactic acid bacterium, a residue of the culture of the lactic acid bacterium, and a treated product thereof.

(2) The feed supplement according to (1), wherein the culture of the lactic acid bacterium is a culture obtainable by inoculating the lactic acid bacterium to a medium containing a whey protein derivative, followed by a neutralization culturing.

(3) The feed supplement according to (2), wherein the whey protein derivative is at least one selected from a whey protein concentrate (WPC), a whey protein isolate (WPI) and a hydrolysate thereof.

(4) The feed supplement according to any one of (1) to (3), wherein the treated product is at least one selected from a concentrate, a pasted product, a dried product, a liquid product, a diluted product and a sterilized product.

(5) The feed supplement according to (4), wherein the dried product is at least one selected from a spray-dried product, a freeze-dried product, a vacuum-dried product and a drum-dried product.

(6) The feed supplement according to (1), which further comprises an excipient.

(7) The feed supplement according to (6), wherein the excipient is at least one selected from a starch, a dextrin, a milk component, and a silicic acid.

(8) The feed supplement according to any one of (1) to (7), wherein the lactic acid bacterium is *Lactobacillus gasseri* OLL 2716 (FERM BP-6999).

(9) A feed composition comprising the feed supplement according to any one of (1) to (8) and a feed.

(10) The feed composition according to (9), wherein the feed is at least one selected from a substitute milk, an artificial milk or a starter.

(11) A method of improving an intestinal flora, which comprises administering an effective amount of the feed supplement according to (1) to a livestock.

(12) A method of preventing a diarrhea, which comprises administering an effective amount of the feed supplement according to (1) to a livestock.

(13) A method of enhancing an antioxidant ability, which comprises administering an effective amount of the feed supplement according to (1) to a livestock.

(14) A method of increasing a weight, which comprises administering an effective amount of the feed supplement according to (1) to a livestock.

(15) Use of the feed supplement according to any one of (1) to (8) for improving an intestinal flora of a livestock.

(16) Use of the feed supplement according to any one of (1) to (8) for preventing a diarrhea of a livestock.

(17) Use of the feed supplement according to any one of (1) to (8) for enhancing an antioxidant ability of a livestock.

(18) Use of the feed supplement according to any one of (1) to (8) for increasing a weight of a livestock.

(19) Use of the feed supplement according to any one of (1) to (8) for the manufacture of a feed composition for improving an intestinal flora of a livestock.

(20) Use of the feed supplement according to any one of (1) to (8) for the manufacture of a feed composition for preventing a diarrhea of a livestock.

(21) Use of the feed supplement according to any one of (1) to (8) for the manufacture of a feed composition for enhancing an antioxidant ability of a livestock.

(22) Use of the feed supplement according to any one of (1) to (8) for the manufacture of a feed composition for increasing a weight of a livestock.

(23) The method according to any one of (11) to (14), wherein the livestock is a young livestock during a period of from afterbirth to a weaning stage.

(24) The use according to any one of (15) to (22), wherein the livestock is a young livestock during a period of from afterbirth to a weaning stage.

(25) The method according to (23), wherein the young livestock is a calf.

(26) The use according to (24), wherein the young livestock is a calf.

Namely, the present invention relates to a feed supplement containing the cultured component of *L. gasseri*. The cultured component of *L. gasseri* is at least one selected from the culture (whole culture including bacterium bodies, medium components and metabolic secretions, etc.) obtainable by culturing *L. gasseri*, bacterium bodies isolated therefrom, crushed bacterium bodies, residue of the culture obtained by removing solid matters including bacterium bodies from the culture (including a culture supernatant which is not a turbid portion of the culture solution but a clear portion), and treated products thereof (concentrates, pasted products, dried products (at least one of spray-dried products, freeze-dried products, vacuum-dried products and drum-dried products), liquid products, diluted products and sterilized products]. The term "feed composition" as used herein includes a feed supplement and a feed, which contain the cultured component of *L. gasseri*.

Although *L. gasseri* may be cultured in a conventional manner employed for bacteria including lactic acid bacteria, a synthetic medium or a semi-synthetic medium facilitating isolation of cells by centrifugal separation is preferably used. As a cultivation method, neutralization culturing is preferably carried out until the number of bacteria reaches a predetermined high concentration with maintaining the pH within a certain range. By the above high-concentration cultivation method, a culture rich in bacterium bodies and metabolites can be obtained.

As a medium, a synthetic medium, a semi-synthetic medium, and other ordinarily employed media can be arbitrarily used. For a desirable high-concentration culture solution of *L. gasseri*, a medium containing a whey protein derivative and/or lactose, especially a medium composed mainly of a whey protein derivative and/or lactose is used.

In the ordinary cultivation method, by inoculating *L. gasseri* into a medium and culturing at 35 to 42° C. for 12 to 24 hours, the number of bacteria reaches almost the maximum value, more specifically, $10^9$ cfu/ml or less. Further, the production amount of organic acids which are metabolite components is 1.5 wt. % or less relative to the culture solution.

On the other hand, the neutralization cultivation method is carried out while maintaining the pH of the culture solution within a range of from 4.5 to 7.0, preferably from 5.0 to 6.5, though depending on the target product, by adding an alkali solution in accordance with the production amount of the organic acid, whereby the suppression of proliferation of *L. gasseri* by the organic acid formed thereby can be prevented. Although the temperature and culture time differ depending on the situation, culturing is carried out by the above-described method at 30 to 45° C., preferably at 35 to 40° C. for 24 to 60 hours, preferably for 24 to 48 hours. The neutralization cultivation method makes it possible to increase the number of bacteria to $10^8$ to $10^{11}$ cfu/ml, preferably $10^9$ to $10^{11}$ cfu/ml, more preferably $10^{10}$ to $10^{11}$ cfu/ml. Thus, an increase in the number of bacteria to $10^9$ cfu/m or greater can be attained. In addition, the formation amount of the organic acid which is a metabolite component exceeds 3 wt. % relative to the culture solution.

The culture (culture solution) obtainable by culturing *L. gasseri* has a physiological activity attributable to the bacterium body components and metabolite components (organic acid, peptide, oligosaccharide and the like), and *L. gasseri* not only produces lactic acid and bacteriocin having an antibacterial property but also produces oligo DNA having an immunostimulating activity. The present inventors therefore consider at present that these products and physiological activity organically work, and thereby bringing about anti-diarrhea and other effects for young livestock. Neutralization culturing (high concentration culturing) is desired in order to attain such effects.

After culturing, preferably after the number of bacteria reaches high concentration as a result of neutralization culturing, the bacterium bodies are preferably isolated. As a preferable method for isolating bacterium bodies, centrifugal separation may be mentioned. A culture supernatant containing the whole portion of the bacterium bodies, preferably a culture supernatant containing a portion of the bacterium bodies and a large amount of metabolite components is obtained. The culture supernatant is often sterilized for use. The sterilization conditions are not particularly limited insofar as the sterilization can be carried out, and the sterilization temperature and time are combined properly and determined arbitrarily so as to accomplish the sterilization. Sterilization is conducted preferably at 50 to 200° C. for 0.1 second to 1 hour.

As the whey protein derivative, at least one selected from whey protein concentration (WPC), whey protein isolate (WPI) and hydrolysates thereof may be used, and commercial items may also be arbitrarily used.

WPC is obtainable by treating whey, which is by-produced during the production of cheese or casein, by ultrafiltration, gel filtration, separation of lactose crystal or the like, followed by raising the protein content usually to 35 to 85 wt. % (in terms of solid content). WPI is different from WPC and has a protein content raised to about 95 wt. % (in terms of solid content) by the ion exchange method or the like.

As the hydrolysate, an enzyme-treated product obtainable by treating at least one selected from WPC, WPI, whey, and whey protein with a proteolytic enzyme such as pepsin, trypsin or papain may be used.

The feed supplement of the invention can be made into any form of liquid, paste and solid, but it is preferably employed in a solid form. It can be used by mixing with an excipient. As the excipient, starch, dextrin, protein, milk components such as lactose, silicic acid, etc. can be used.

The feed supplement of the invention can be administered to livestock as a feed composition by adding the feed supplement to feed, or can also be administered to livestock singly or as a mixture with drinking water. Preferred examples of the feed include substitute milk, starter diet and artificial milk ("Dairy Japan", published by Dairy Japan Co., Ltd., January issue, p. 33-37(2000); "*Bokuso to Engei* (Herbage and Gardening)", published by Snow Brand Seed Co., Ltd., 49(2), p. 9-11(2001); "*Seisanjyu Iryo System* (Production Medicine System), Dairy Cow Volume 1", published by Rural Culture Association, p. 10-28(1999)).

With regards to a daily dose per young livestock, 0.1 to 10 g, preferably 0.5 to 5 g in terms of a solid content is adequate for calves. The above range is only a rough standard and the dose can be determined arbitrarily, depending on the kind, size, symptoms or the like of young livestock. The dose may exceed the above-described range in some cases. Although the administration period of the feed supplement of the invention is not particularly limited, the period may preferably include a period from afterbirth to a weaning stage, more preferably a period from just afterbirth to the time when the young livestock itself becomes able to produce antibodies sufficiently (about 6 week old). Even when the livestock is not a calf, the supplement may be administered at the same dose for the same administration method.

The object of the present invention include mammals (preferably, mammals other than human) and birds, preferably domestic animals (including poultry) such as cows, horses, goats, sheep, pigs, buffalos, camels and fowls, more preferably, domestic animals (mammals), still more preferably young livestock. The term "young livestock" as used herein means livestock from afterbirth to a weaning stage. However, it is also possible to administer to livestock after the weaning stage or adult livestock.

Administration of the feed supplement of the invention to livestock, particularly young livestock makes it possible to improve the intestinal flora thereof and bring about anti-diarrhea, antioxidant and weight increasing effects without using an antibiotic.

In the invention, any lactic acid bacteria can be used insofar as they are bacteria belonging to *L. gasseri*. One of the suitable bacteria is *Lactobacillus gasseri* OLL 2716 strain.

The *L. gasseri* OLL 2716 strain is effective for removal of *H. pyroli* or protection from *H. pylori* infection, is a strain selected in Japanese Patent No. 30463033. The basis of the selection thereof is shown below. Namely, the basis of a number of lactobacilli derived from human intestines: (1) high resistance against gastric acid, (2) good growth under low pH conditions, (3) high inhibitory activity against adhesion of *H. pylori* to human gastric cancer cell MK N45, (4) high inhibitory capacity against proliferation of *H. pylori* when a mixture with *H. pylori* is cultured, (5) high activity to remove *H. pylori* when administered to a *H. pylori*-infected model mice, and (6) high survival property and excellent taste and physical properties when applied to foods. As a result of the extensive investigations, *Lactobacillus gasseri* OLL 2716 strain (internationally deposited as No. FERM BP-6999 with the Research Institute of Life Science and Technology, the Agency of Industrial Science and Technology, Ministry of International Trade and Industry (Zip Code: 305-8566, 1-1-3, Higashi, Tsukuba, Ibaraki, Japan), which is a previous address, or International Patent Organism Depositary, National Institute of Advanced Industrial Science and Technology (Zip code: 305-8566, Central 6, 1-1-1 Higashi, Tsukuba, Ibaraki, Japan), which is a present address, on Jan. 14, 2000) is found as the strain satisfying the above-described standards.

*L. gasseri* OLL 2716 (FERM BP-6999) has the following bacteriological properties.

A: Morphological Properties
  Cell morphology: rod-shaped bacterium
  Motility: none
  Spores: none
  Gram staining: positive B: Physiological Properties (Positive: +, Negative: −, Weakly Positive: W)

| | |
|---|---|
| Catalase: | − |
| Gas production: | − |
| Growth at 15° C.: | − |

-continued

| Assimilation of gluconic acid: | − |
| Optical rotation of lactic acid: | DL |
| Aerobic growth: | + |

C. Carbohydrate Fermentation (Positive: +, Negative: −, Weakly Positive: W)

| Arabinose: | − |
| Xylose: | − |
| Rhamnose: | − |
| Ribose: | − |
| Glucose: | + |
| Mannose: | + |
| Fructose: | + |
| Galactose: | + |
| Sucrose: | + |
| Cellobiose: | + |
| Lactose: | + |
| Trehalose: | + |
| Melibiose: | − |
| Raffinose: | − |
| Melezitose: | − |
| Starch: | W |
| Mannitol: | − |
| Sorbitol: | − |
| Dextrin: | W |

DETAILED DESCRIPTION OF THE DRAWINGS

Figure 3:
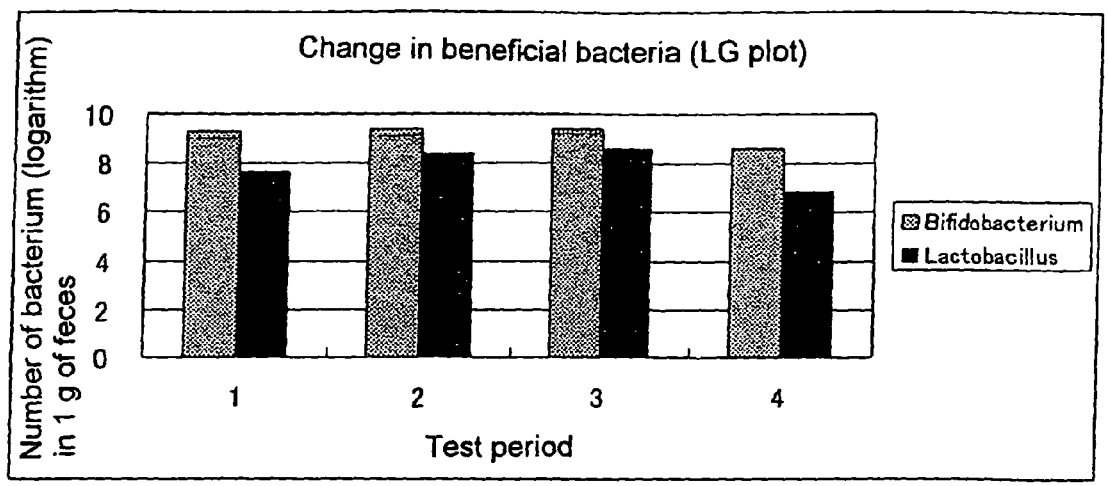

FIG. 3 also shows a similar change in LG plot, that is, a *L. gasseri* OLL 2716 (FERM BP-6999) administered plot.

Figure 4:
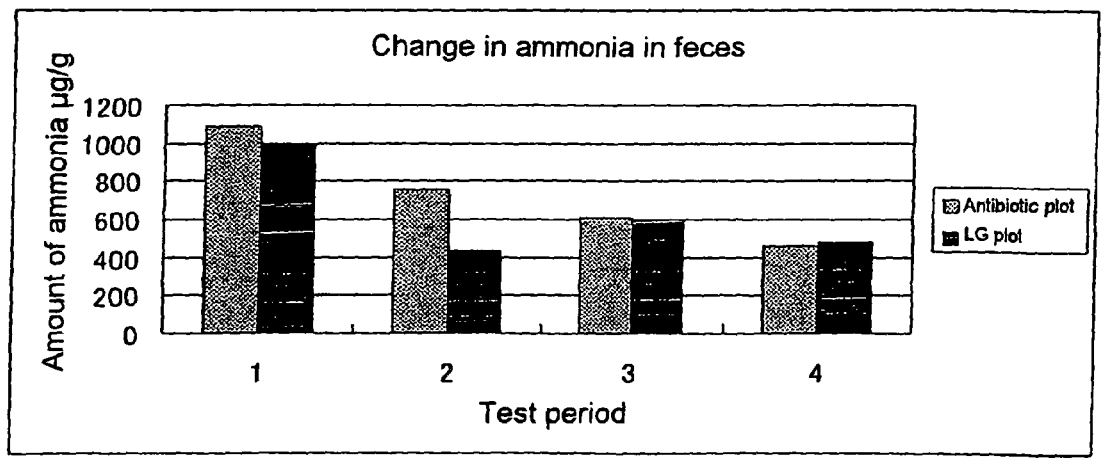

FIG. 4 shows a change in the ammonia amount in feces in Antibiotic plot and LG plot.

Figure 5:
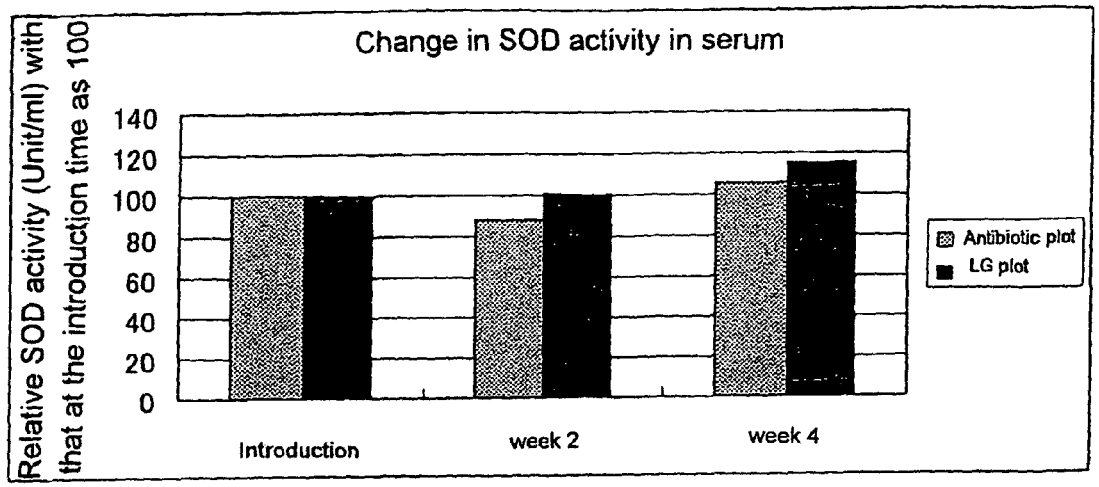

FIG. 5 shows a change in SOD activity in the serum in Antibiotic plot and LG plot.

Figure 6:
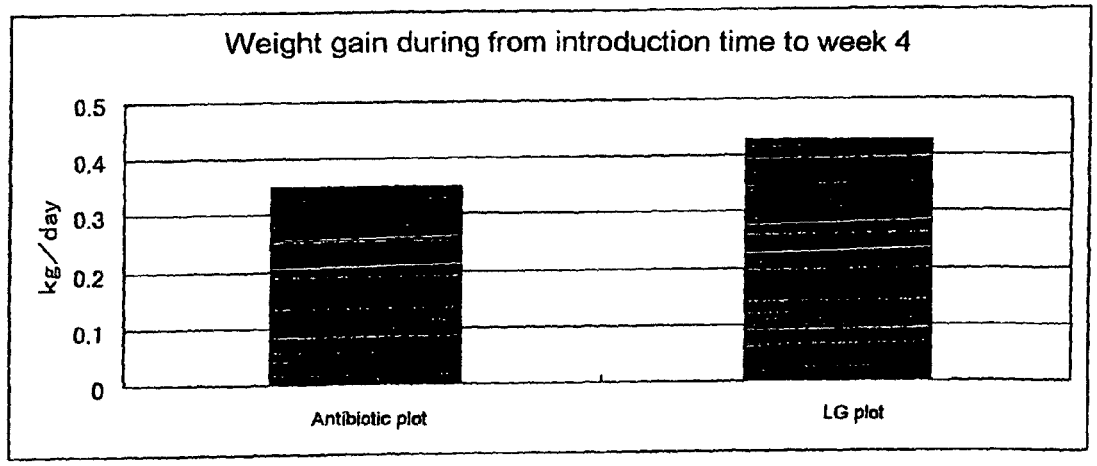

FIG. 6 shows a weight gain in Antibiotic plot and LG plot.

BEST MODE FOR CARRYING OUT THE INVENTION

The followings will specifically describe the present invention based on Examples, but the invention is not limited thereto.

The composition of substitute milk provided for the test and administration schedule of the substitute milk to be tested are as follows. As a concentrate whey protein, commercially available WPC was used, while as the residue of a culture of *L. gasseri*, used was a residue obtainable by culturing *L. gasseri* OLL 2716 (FERM BP-6999), centrifuging the whole culture (containing 15000 million cells/ml), followed by sterilizing the resulting liquid portion (supernatant liquid).
Composition of Substitute Milk Provided for the Test

| Skim milk powder | 50% |
| Concentrated whey protein | 14% |
| Mixed oil | 22.5% |
| Premix (vitamins, minerals) | 13.5% |
| Total | 100% |

With the above-described substitute milk as base milk, the base milk and 5% of the residue of a culture of *L. gasseri* were administered to *L. gasseri* plot (LG plot). In this regard, it is to be noted that the residue was used after sterilization at 65° C. for 30 minutes.

The base milk and antibiotic were administered to Antibiotic plot.

In this regard, it is to be noted that the antibiotic administered contained 4.2 million units/ton of bacitracin zinc and 20 g titer/ton of colistin sulfate.

Administration Schedule of Substitute Milk to be Tested

Japanese cows (Japanese Black Cattle) born in a contract farmer were fed with a sufficient amount of colostrum immediately after birth and two weeks after birth, they were introduced into the test farm of the present company. They were classified into two groups, those in LG plot and those in Antibiotic plot. The above-described substitute milk (250 g) to be tested was dissolved in 1.8 L of warm water (45° C.) and administered twice, in the morning and in the evening.

Test Period:
(1) Introduction time (week 2 after feeding with colostrum and raw milk after birth)
(2) Week 2 (at week 2 after feeding with test substitute milk after introduction)
(3) Week 4 (at week 4 after feeding with test substitute milk after introduction)
(4) Week 1 after weaning (at week 1 after weaning which was conducted at week 8 after test substitute milk was fed after introduction).

EXAMPLE 1

Diarrhea Incidence Reduction Test

Figure 1:
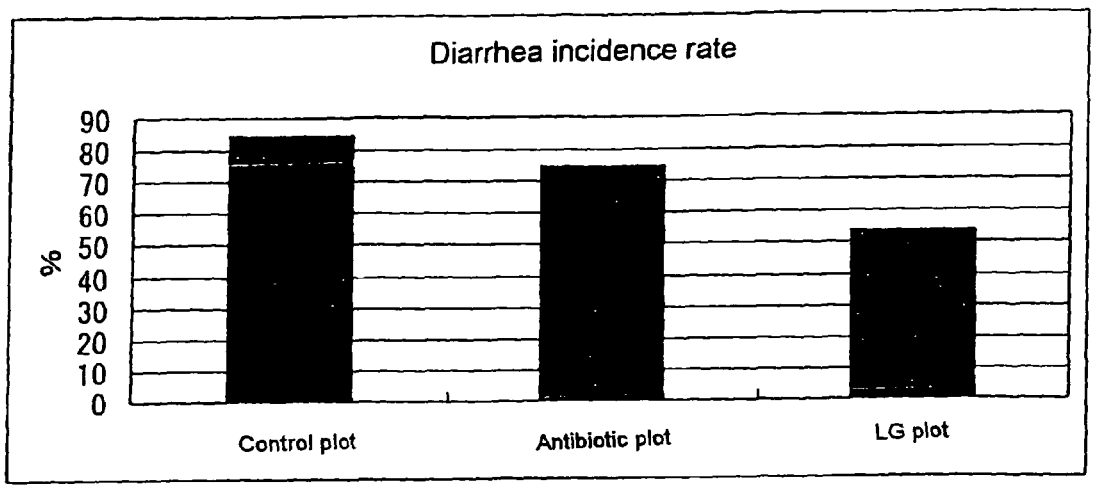
FIG. 1 is a graph of diarrhea-incidence rate (%) in each plot.

In the undermentioned test plots, a diarrhea incidence rate (incidence rate of diarrhea within two weeks after introduction) was determined and results are shown in the undermentioned Table 1 and FIG. 1. The numerals in the parenthesis in Table 1 mean the number of calves which suffered from diarrhea relative to the total number of calves to be tested.
(Administered Substance Plot)
Control plot (base milk)
LG plot
Antibiotic plot

TABLE 1

Results of diarrhea incidence rate

| Control plot (base milk) | 85% (11/13) |
| LG plot | 54% (7/13)* |
| Antibiotic plot | 75% (9/12) |

*Significant difference (p < 0.05)

The above results clearly show that the administration of LG reduced the incidence of diarrhea and alleviated diarrhea more than the administration of an antibiotic.

EXAMPLE 2

Tests on Flora Improvement, Putrefaction Product Formation Inhibition and Weight Gain Calves were classified into the undermentioned test plots and tests on flora improvement, putrefaction product formation inhibition and weight gain were performed. These tests were each conducted for the test periods (1), (2), (3) and (4). The results are shown below, each with an average value.

(Administration Test)
　LG plot (10 calves)
　Antibiotic plots (12 calves)
(1) Intestinal Flora Improvement Test Calves in each of Antibiotic plot and LG plot were studied for a change in the intestinal flora in each test period. Bacteria to be studied were undermentioned (A) to (E) and the number of bacteria in 1 g of feces was measured.
(Bacteria to be Tested)
　(A) *Bifidobacterium* sp.
　(B) *Lactobacillus* sp.
　(C) *Enterobacteriaceae* sp.
　(D) *Clostridium*, Lecithinase (+) sp.
　(E) *Clostridium*, Lecithinase (−) sp.

Figure 2:
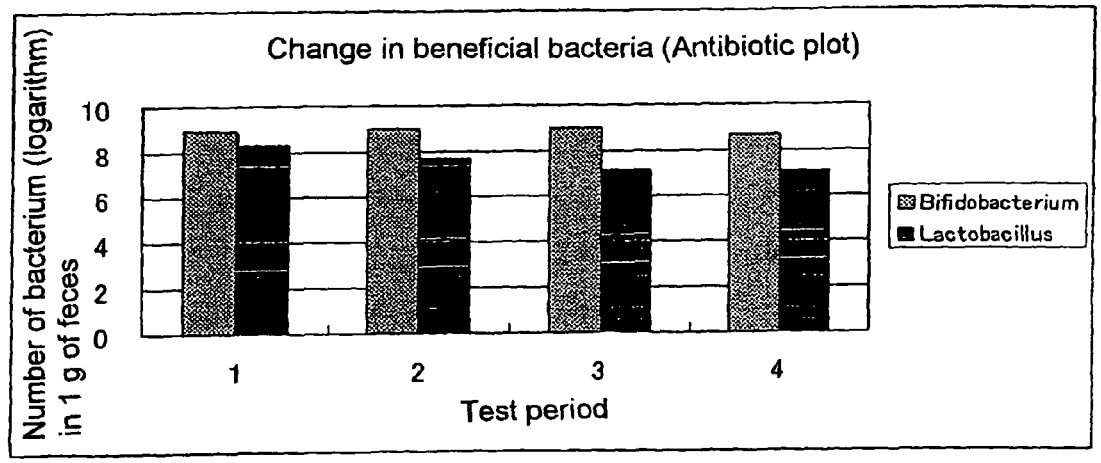
FIG. 2 shows a change of the beneficial bacteria (*Bifidobacterium* spp. and *Lactobacillus* spp.) in an antibiotic-administered plot during each test period.

The results in Antibiotic plot are shown in Table 2 and FIG. 2, while those in LG plot are shown in Table 3 and FIG. 3. Data in each table are indicated by the logarithm of the number of bacteria in 1 g of feces, while in *Clostridium* sp. (D and E), data are indicated by the detection rate (%). In FIGS. 2 and 3, data of *Bifidobacterium* sp. (A) and *Lactobacillus* sp. (B) are graphically illustrated.

TABLE 2

Changes in intestinal flora in Antibiotic plot

|  | Test period | | | |
|---|---|---|---|---|
|  | (1) | (2) | (3) | (4) |
| (A) | 8.92 | 9.02 | 9.01 | 8.69 |
| (B) | 8.30 | 7.69 | 7.16 | 7.11 |
| (C) | 8.84 | 8.91 | 8.23 | 7.95 |
| (D) | 83% | 65% | 58%* | 67% |
| (E) | 75% | 17% | 33% | 50% |

*Significant difference ($p < 0.05$)

TABLE 3

Changes in intestinal flora in LG plot

|  | Test period | | | |
|---|---|---|---|---|
|  | (1) | (2) | (3) | (4) |
| (A) | 9.34 | 9.41 | 9.38 | 8.63 |
| (B) | 7.61 | 8.41 | 8.64* | 6.85 |
| (C) | 9.09 | 8.55 | 8.06* | 7.79 |
| (D) | 90% | 60% | 50%* | 60% |
| (E) | 80% | 20% | 40% | 90% |

*Significant difference ($p < 0.05$)

The above results clearly show that in the introduction stage, some calves do not have a sufficient amount of *Bifidobacterium* and *Lactobacillus* and a large difference exists among calves, but administration of LG for two weeks increases the amount of each of *Bifidobacterium* and *Lactobacillus* and reduces a difference among calves. During the latter period, calves tend to suffer from diarrhea so that an increase in beneficial bacteria is effective. With regards to the effect for increasing the beneficial bacteria, LG is superior to antibiotic. In particular, it is very significant that the number of bacteria of *Lactobacillus* which is useful for calves shows a decrease by the administration of an antibiotic, while it shows an increase by the administration of LG.

(II) Test on Putrefaction Product Formation Inhibition

In each of Antibiotic plot and LG plot, an amount of the putrefaction product (ammonia) in feces of calves in each test period was measured. The results are shown in the Table 4 and FIG. 4 below. The amount of the ammonia is expressed in μg/g of feces.

TABLE 4

A change in the amount of putrefaction product (ammonia) (μg/g of feces)

|  | Test period | | | |
|---|---|---|---|---|
|  | (1) | (2) | (3) | (4) |
| Antibiotic plot | 1090 | 753 | 607* | 462 |
| LG plot | 1000 | 434 | 603* | 483 |

*Significant difference ($p < 0.05$)

The above-described results clearly show that two-week administration of LG after introduction of calves decreases the amount of ammonia in feces. A reduction in the putrefaction product in this period is useful. The results of this test well correspond to decreasing results of *Clostrdium*, putrefactive bacteria.

(III) Test on Antioxidant Activity

In each of Antibiotic plot and LG plot, the activity of superoxide dismutase (SOD) having an antioxidant activity in the serum of calves was measured at the time of introduction and at week 2 and week 4 after administration. The results are shown in the Table 5 and FIG. 5 below.

TABLE 5

Comparisons in SOD activity in the serum
Numerals in the table are each a relative SOD value
(unit/ml) with that at the introduction time as 100.

|  | Introduction time | Week 2 | Week 4 |
|---|---|---|---|
| Antibiotic plot | 100 | 80 | 105 |
| LG plot | 100 | 101 | 115* |

*Significant difference ($p < 0.05$)

It is found that the SOD activity with LG administration is maintained higher than that with antibiotic administration. Calves tend to generate active oxygen having a harmful influence on their bodies by the stress during transportation or the environment. The SOD activity in the serum of calves tends to lower for several weeks after introduction so that a rise in SOD activity in the serum during this period is effective for eliminating the influence of active oxygen.

(IV) Test on Weight Gain

A daily weight gain of calves in each of Antibiotic plot and LG plot was measured from the time of introduction until week 4. The results are shown in the Table 6 and FIG. 6 below. The weight gain is expressed in Kg per day.

TABLE 6

Weight gain (daily weight gain from the time of introduction until week 4: Kg)

| Antibiotic plot | 0.35 |
|---|---|
| LG plot | 0.43 |

The above-described results clearly show that the weight gain in LG plot is superior by 23% to that in Antibiotic plot.

According to the invention, as is apparent from the above-described Examples, administration of a (sterilized) residue of a culture of *L. gasseri* OLL 2716 to calves from afterbirth to weaning time exerts an excellent intestinal flora improving effect, and in addition, remarkably improves anti-diarrhea, antioxidant and weight increasing effects, compared with administration of an antibiotic (colistin sulfate, bacitracin zinc).

The invention was described specifically and with reference to specific embodiments. It is evident to those skilled in the art that the invention can be changed or modified without departing from the spirit and scope of the invention.

The present application is based on Japanese Patent Application (Japanese Patent Application 2003-104551) filed on Apr. 8, 2003, contents thereof are incorporated herein as a reference. References cited herein are all incorporated as a whole.

INDUSTRIAL APPLICABILITY

Administration of the feed composition of the invention derived from *Lactobacillus gasseri* to young livestock such as calves is remarkably effective, for example, improves the intestinal flora, positively reduces and suppresses incidence of diarrhea, reduces and suppresses formation amounts of putrefaction products such as ammonia, and reduces the influence of active oxygen, thereby causing weight gain.

Young livestock is liable to suffer from various diseases, particularly digestive diseases having diarrhea as a main symptom and respiratory diseases having pneumonia as a main symptom. These diseases retard their growth and reduce the productivity drastically, which cause great damage and loss to farmers. The invention makes it possible to remove or greatly inhibit one of the causes and significantly contributes to the dairy industry.

The invention claimed is:

1. A feed supplement comprising:
   (i) a culture obtainable by inoculating and cultivating *Lactobacillus gasseri* OLL 2716 (FERM BP-6999) in a medium containing a whey protein derivative, wherein the whey protein derivative is selected from the group consisting of a whey protein concentrate (WPC), a whey protein isolate (WPI), a hydrolysate of the whey protein concentrate, and a hydrolysate of the whey protein isolate;
   (ii) *Lactobacillus gasseri* OLL 2716 (FERM BP-6999) bodies isolated from the culture (i); and
   (iii) a supernatant of the culture (i), wherein the supernatant is obtained by removing solid matters from the culture (i);
   wherein feed supplement has one or more of intestinal flora-balancing activity, anti-diarrhea activity, antioxidant activity, weight increasing activity and growth promoting activity when fed to the calves.

2. The feed supplement according to claim 1, wherein the culture, the *Lactobacillus gasseri* OLL 2716 (FERM BP-6999) bodies isolated from the culture, and the supernatant of the culture are in the form of at least one of a concentrated product, a pasted product, a dried product, a liquid product, a diluted product and a sterilized product.

3. The feed supplement according to claim 2, wherein the dried product is at least one of a spray-dried product, a freeze-dried product, a vacuum-dried product and a drum-dried product.

4. The feed supplement according to claim 1, which further comprises an excipient.

5. The feed supplement according to claim 4, wherein the excipient is at least one of a starch, a dextrin, a milk component, and a silicic acid.

6. The feed supplement according to claim 1, wherein the *Lactobacillus gasseri* OLL 2716 (FERM BP-6999) bodies are crushed after isolation from the culture.

7. A method of improving an intestinal flora, which comprises administering an effective amount of the feed supplement according to claim 1 to calves during a period from after birth to a weaning stage.

8. A method for improving intestinal flora-balancing activity, antidiarrhea activity, antioxidant activity, weight-increasing activity, and growth-promoting activity of calves by administering to the calves the feed supplement of claim 1.

* * * * *